United States Patent
Dandra et al.

(10) Patent No.: US 10,313,963 B2
(45) Date of Patent: Jun. 4, 2019

(54) METHODS FOR SELECTING RADIO ACCESS TECHNOLOGY (RAT) MODES IN WIRELESS COMMUNICATION DEVICES

(71) Applicant: Samsung Electronics Co., Ltd., Suwon-si, Gyeonggi-do (KR)

(72) Inventors: Prasad Basavaraj Dandra, Bangalore (IN); Vijay Ganesh Surisetty, Bangalore (IN); Siddhi Chandrashekhar Mayekar, Bangalore (IN); Akshay Rastogi, Bangalore (IN); Jae-Kyu Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/890,903

(22) Filed: Feb. 7, 2018

(65) Prior Publication Data
US 2018/0249405 A1    Aug. 30, 2018

(30) Foreign Application Priority Data
Feb. 27, 2017   (IN) .............................. 201741006953

(51) Int. Cl.
*H04W 4/00* (2018.01)
*H04W 48/18* (2009.01)
*H04W 88/06* (2009.01)
*H04W 8/22* (2009.01)
*H04W 48/16* (2009.01)

(52) U.S. Cl.
CPC .............. *H04W 48/18* (2013.01); *H04W 8/22* (2013.01); *H04W 48/16* (2013.01); *H04W 88/06* (2013.01)

(58) Field of Classification Search
CPC ....... H04W 48/16; H04W 8/22; H04W 88/06; H04W 48/18; H04W 4/023; H04W 4/22; H04W 4/90; H04W 4/02; H04W 4/50; H04Q 7/20; G06F 15/16; G01S 5/0036; G01S 19/05; H04L 63/0485
USPC ..................... 455/343, 432.1, 435.2; 370/328
See application file for complete search history.

(56) References Cited

U.S. PATENT DOCUMENTS

| | | | |
|---|---|---|---|
| 9,369,935 B2 * | 6/2016 | Balasubramanian | H04W 36/245 |
| 9,560,581 B2 * | 1/2017 | Xing | H04W 48/16 |
| 9,826,472 B2 * | 11/2017 | Basavaraj | H04W 48/18 |
| 9,992,760 B2 * | 6/2018 | Jiang | H04W 60/04 |

(Continued)

FOREIGN PATENT DOCUMENTS

| | | | | |
|---|---|---|---|---|
| CN | 103384400 A | * | 11/2013 | ............ H04W 48/18 |
| EP | 2608606 A1 | * | 6/2013 | ............ H04W 48/18 |

(Continued)

*Primary Examiner* — Mahendra Patel
(74) *Attorney, Agent, or Firm* — Harness, Dickey & Pierce, P.L.C.

(57) ABSTRACT

Some example embodiments disclose methods for selecting registered public land mobile network (RPLMN) radio access technology (RAT) modes in wireless communication devices. The method as disclosed herein includes determining location information of the wireless communication device; validating the location information; deriving a RPLMN from the validated location information when the validating is successful; storing a RPLMN access technology (AccTech) based on the derived RPLMN; and selecting a RAT mode using the stored RPLMN AccTech.

18 Claims, 5 Drawing Sheets

(56) References Cited

U.S. PATENT DOCUMENTS

| | | | |
|---|---|---|---|
| 2008/0220772 A1* | 9/2008 | Islam | H04W 48/18 455/432.2 |
| 2009/0129342 A1* | 5/2009 | Hwang | H04W 36/0022 370/331 |
| 2009/0275329 A1* | 11/2009 | Sokondar | H04W 48/16 455/434 |
| 2012/0202492 A1* | 8/2012 | Moisanen | H04W 60/00 455/435.1 |
| 2013/0178208 A1* | 7/2013 | Dahlen | H04W 48/18 455/435.2 |
| 2013/0295986 A1* | 11/2013 | Mueck | H04W 48/18 455/552.1 |
| 2016/0127884 A1* | 5/2016 | Kim | H04W 28/0226 455/435.2 |
| 2016/0157150 A1* | 6/2016 | Wirtanen | H04W 48/16 455/434 |
| 2016/0338071 A1* | 11/2016 | Khosla | H04W 72/1215 |

FOREIGN PATENT DOCUMENTS

| | | | |
|---|---|---|---|
| EP | 2608606 A1 | | 6/2013 |
| KR | 20070069483 A | * | 7/2007 |

* cited by examiner

METHODS FOR SELECTING RADIO ACCESS TECHNOLOGY (RAT) MODES IN WIRELESS COMMUNICATION DEVICES

PRIORITY

This application claims priority under 35 U.S.C. § 119(a) to an Indian Patent Application Serial No. 201741006953 (CS), which was filed on Feb. 27, 2017 in the Indian Intellectual Property Office, the entire disclosure of which is incorporated herein by reference.

TECHNICAL FIELD

Some example embodiments relate to wireless communication and particularly to methods for selecting registered public land mobile network (RPLMN) radio access technology (RAT) modes in wireless communication devices.

BACKGROUND

Users expect an easy, quick and powerful experience whenever they use the latest electronic devices—and they want the same in their business lives. The user continues to demand a richer communication experience, especially users who are increasingly mobile or remote. It is desirable to provide access to content and services to a user away from the user's office or home, and on multiple devices. Businesses are increasingly deploying (or allowing) the use of smartphones and tablets. This deployment is largely served by Long-Term Evolution (LTE) technology. However, service providers continue to provide the other RATs. Thus, it would be desirable to enable user equipment (UEs) and tablets to select the best services and RATs among the available services and RATs quickly and with low power consumption. Users will not be able to use the best services if the users' devices select an inferior RAT. This may result in inefficient use of technology and resources impacting sales for both UE and network vendors and reducing the quality of user experience. In view of the above, a new algorithm is presented below to quickly select the best possible RAT once the device is powered on or out of coverage/roaming.

In traditional procedures, when a UE is switched on, an RPLMN RAT is selected based on access technology (AccTech) information saved in a User Services Identity Module (USIM) card or a non-volatile memory (e.g., flash memory) in the UE. However, even using a flash memory with valid AccTech, it is possible that a UE might select a lower priority RAT. Selection of a lower priority RAT could occur due to reselection/redirection/handover to a lower priority RAT in the most recent power on cycle as the flash memory will be updated or due to fall back to third generation (3G) or second generation (2G) of wireless mobile telecommunications technology during Circuit Switched FallBack (CSFB) call procedures and subsequent power off.

According to conventional procedures, a RAT is selected as follows. If during the most recent power on/off cycle, the UE selects a lower priority RAT, the lower priority RAT will be selected for a network search in the next power on cycle. For example, suppose the user is currently located in an area where only a 2G/3G network is available and the UE switches off or goes into flight mode. When the user moves to an area where a fourth generation (4G) of wireless mobile telecommunication technology network is available and switches on the UE, then by conventional procedures, the lower priority RAT that is either 2G or 3G will be selected for a network search in the next power on cycle. The UE will then switch to 4G through an Inter-Radio Access Technology (IRAT) procedure which may take more time.

Conventional UEs may save the RPLMN AccTech in flash memory and use it in the next power on. However, when the Subscriber Identity Module (SIM) card is changed, the UE uses the RPLMN AccTech of the previous SIM. In another case, a UE might detect the SIM change and avoid using the RPLMN AccTech from the flash memory but rather follow the priority order LTE>3G>2G. Following this priority order may delay UE registration during recovery or power on. The challenge discussed above may be observed in Dual SIM Dual Standby (DSDS) devices during SIM swap. Even though the new SIM has the ability to register on a higher priority RAT, the DSDS device will select a lower priority RAT. Since DSDS devices use a single radio-frequency (RF) resource (e.g., RF transceiver), reselecting a higher priority RAT may be further delayed based on activity on the other SIM.

In view of the foregoing, it would be desirable to provide methods which enable the UE to select the best registered public land mobile network (RPLMN) radio access technology (RAT) mode in wireless communication devices.

SUMMARY

Some example embodiments disclose methods for selecting registered public land mobile network (RPLMN) radio access technology (RAT) modes in wireless communication devices. The methods include determining location information of the wireless communication device. The methods further include validating the location information. The methods further include deriving a RPLMN from the validated location information when the validating is successful. The methods further include storing a RPLMN access technology (AccTech) based on the derived RPLMN. Here, the derived RPLMN AccTech is an intelligent information of all supported RATs where UE can receive a successful registration. Furthermore, the methods include selecting a RAT mode using the stored RPLMN AccTech. In some example embodiments, the operating mode is a LTE/UMTS/GSM mode i.e. UE is functioning in LTE/UMTS/GSM RAT mode but the derived RPLMN AccTech is UMTS/GSM. In this instance, UE decides that there is high probability of getting successful registration on UMTS RAT so UE tries UMTS first.

According to some example embodiments herein, the location information includes tracking area identity (TAI) information, routing area identification (RAI) information and location area identity (LAI) information. These are extracted from evolved packet system location information (EPSLOCI), packet system location information (PSLOCI) and location information (LOCI), respectively.

According to some example embodiments herein, deriving the RPLMN from the validated location information includes: reading EPSLOCI either from SIM or flash memory when a User Services Identity Module (USIM) is not changed, or reading EPSLOCI from SIM when USIM is changed and EPSLOCI is present in the USIM and further invalidating the EPSLOCI from the flash memory when USIM is changed and EPSLOCI is absent in the USIM.

According to some example embodiments herein, the method further includes reading PSLOCI or LOCI from a Subscriber Identity Module (SIM).

According to some example embodiments herein, storing of the RPLMN AccTech includes determining a SIM preferred list from a Subscriber Identity Module (SIM) based on the current operating mode. Checking for the derived RPLMN in the SIM preferred list. After checking, storing preferred AccTech as RPLMN AccTech when the derived RPLMN is present in the SIM preferred list and storing all AccTech supported by operating mode as RPLMN AccTech when the derived RPLMN is absent in the SIM preferred list. In some example embodiments, the operating mode refers to the mode of operation e.g. LTE/UMTS/GSM mode or UMTS/GSM mode or UMTS only mode or GSM only mode etc According to some example embodiments herein, the method further includes adding remaining supported AccTech to the stored RPLMN AccTech based on validity of location update status information. The SIM preferred list includes a home public land mobile network (HPLMN) selector with access technology, a user controlled PLMN selector with access technology, and an operator controlled PLMN selector with access technology.

According to some example embodiments herein, the method further includes of determining RPLMN using last registered RAT stored in the flash memory along with domain information when PLMNs derived from the EPSLOCI and LOCI are different and they are not equivalent to each other.

According to some example embodiments herein, selecting a RAT mode using stored RPLMN AccTech includes checking for validity of an EPS update status and support for a long-term evolution (LTE) network. Selecting an RPLMN RAT mode as LTE when the EPS update status is valid and the long-term evolution (LTE) is supported. Checking for validity of GMM/MM update status and support for universal mobile telecommunications system (UMTS) when the EPS update status is not valid or the long-term evolution (LTE) is not supported. Selecting the RPLMN RAT mode as UMTS when the GMM update status is valid and the universal mobile telecommunications system (UMTS) is supported and selecting the RPLMN RAT mode as a global system for mobile communication (GSM) when the universal mobile telecommunications system (UMTS) is not supported.

According to some example embodiments herein, if all the above conditions fail then selecting a RAT mode based on an operating mode in the order of LTE, UMTS or GSM. The method further includes searching for an RPLMN in stored frequencies to select next highest priority RAT if wireless communication device receives a rejection or registration fails on a highest priority RAT.

According to some example embodiments, methods performed by a wireless communication device are provided. The methods include determining location information of the wireless communication device. The methods further include deriving a RPLMN based on the location information. The methods further include determining at least one AccTech based on the derived RPLMN. Furthermore, the methods include selecting a RAT mode based on the at least one AccTech.

The foregoing has outlined, in general, the various aspects of some example embodiments and is to serve as an aid to better understand the more complete detailed description which is to follow. In reference to such, there is to be a clear understanding that the example embodiments are not limited to the methods or applications of use described and illustrated herein. It is intended that any other advantages and objects of the example embodiments that become apparent or obvious from the detailed description or illustrations contained herein are within the scope of the example embodiments.

BRIEF DESCRIPTION OF THE ACCOMPANYING DRAWINGS

The other objects, features and advantages will occur to those skilled in the art from the following description of some example embodiments and the accompanying drawings in which.

Although specific features of some example embodiments are shown in some drawings and not in others, this is done for convenience only as each feature may be combined with any or all of the other features in accordance with some example embodiments.

DETAILED DESCRIPTION

Some example embodiments provide methods for selecting registered public land mobile network (RPLMN) radio access technology (RAT) modes in wireless communication devices. In the following detailed description of some example embodiments, reference is made to the accompanying drawings that form a part hereof, and in which are shown by way of illustration some example embodiments which may be practiced. These example embodiments are described in sufficient detail to enable those skilled in the art to practice the example embodiments, and it is to be understood that other example embodiments may be utilized and that changes may be made without departing from the scope of the example embodiments. The following detailed description is, therefore, not to be taken in a limiting sense, and the scope of some example embodiments is defined only by the appended claims.

The specification may refer to "an", "one" or "some" example embodiment(s) in several locations. This does not necessarily imply that each such reference is to the same example embodiment(s), or that the feature only applies to a single example embodiment. Single features of different example embodiments may also be combined to provide other example embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some example embodiments herein and the various features, advantages and details thereof are explained more fully with reference to the non-limiting example embodiments that are illustrated in the accompanying drawings and detailed in the following description. Descriptions of well-known components and processing techniques are omitted so as to not unnecessarily obscure the example embodiments herein. The examples used herein are intended merely to facilitate an understanding of ways in which the example embodiments herein can be practiced and to further enable those of skill in the art to practice the example embodiments herein. Accordingly, the examples should not be construed as limiting the scope of the example embodiments herein.

According to some example embodiments, evolved packet system location information (EPSLOCI) Elementary Files (EFs) are not mandatory in a SIM. A SIM card without an EF would still be able to access an LTE network. When an EPSLOCI EF is absent in a SIM, the information may be stored in a flash memory of the UE device. Flash memory of the UE and non-volatile memory of the UE may be used interchangeably throughout the following to refer to the internal memory of the UE. Also, EPSLOCI and EPSLOCI EF are used interchangeably throughout the following to refer to the evolved packet system location information.

The deriving of an RPLMN and selection of an RPLMN RAT are performed in two operations. The first operation is to derive an RPLMN from location information such as tracking area identity (TAI) information, a routing area identification (RAI) information and a location area identity (LAI) information. The TAI, RAI and LAI are extracted from evolved packet system location information (EPSLOCI), packet switched location information (PSLOCI) and location information (LOCI), respectively. Further, the EPSLOCI, PSLOCI and LOCI all store supported AccTech for an RPLMN. The second operation is to use an update status that is read from the SIM corresponding to the derived RPLMN to select an RAT for an RPLMN search.

According to some example embodiments, the first operation of deriving an RPLMN from location information includes three cases based on change of a USIM and presence of an EPSLOCI EF in a USIM which are explained below in association with FIGS. 1-3.

Figure 1:
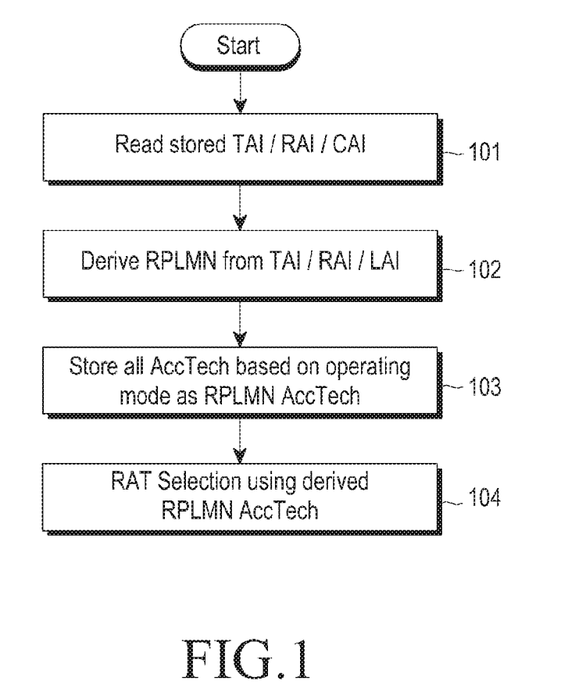
FIG. 1 is a schematic flow diagram illustrating RPLMN derivation when the USIM is not changed, according to some example embodiments.

FIG. 1 is a schematic flow diagram illustrating RPLMN derivation when the USIM is not changed, according to some example embodiments. In this case, the USIM is not changed. According to FIG. 1, at operation 101, EPSLOCI will be read either from the SIM or flash memory and PSLOCI and LOCI will both be read from the SIM. At operation 102, an RPLMN is derived from location information such as TAI, RAI and LAI. According to some example embodiments, the TAI/RAI/LAI comprises of last registered Tracking area Identity (from LTE RAT), Routing area identity (from 2G or 3G data part) & Location area identity (2G or 3G CS part). Each identity is a value of PLMN-ID and area identification number, so the RPLMN is basically the PLMN-ID part derived from these fields. The TAI, RAI and LAI are read and validated from the EPSLOCI, PS LOCI and LOCI. According to some example embodiments, the RPLMN is derived using a last registered RAT stored in the flash memory along with domain information when public land mobile networks (PLMNs) derived from the EPSLOCI and LOCI are different and not equivalent to each other. When all TAI, RAI and LAI are valid and contain different values, the last registered RAT and domain information are used which are stored internally to use the corresponding information value to derive PLMN ID. At operation 103, once the RPLMN is derived, all AccTech based on operating mode is stored as RPLMN AccTech. Here, the operating mode is selected based on compatibility to support some or all or LTE/UMTS/GSM radio access technologies (RATs). If the derived AccTechs are not supported in the operating mode, it is ignored. Further all supported RATs are added as RPLMN AccTech irrespective of a last registered RAT as the UE has previous registration information stored either in a SIM or non-volatile memory. Here, the supported RATs indirectly refer to the RATs supported in the operating mode. For example, if operating mode is LTE/UMTS/GSM mode, the supported RATs are LTE, UMTS & GSM. At operation 104, a RAT is selected using the derived RPLMN AccTech. According to some example embodiments, the RAT is selected according to operations discussed in association with FIG. 4 below.

Figure 2:
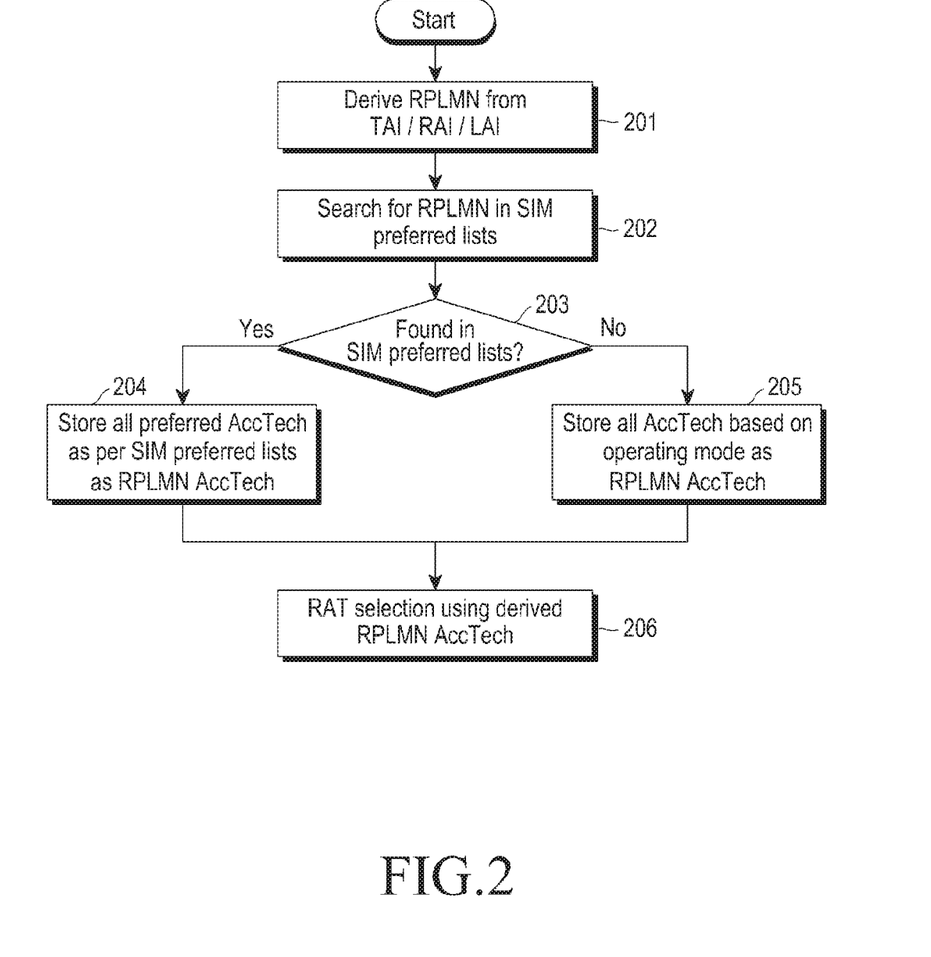
FIG. 2 is a schematic flow diagram illustrating RPLMN derivation when the USIM is changed and EPSLOCI is absent in the USIM, according to some example embodiments.

FIG. 2 is a schematic flow diagram illustrating RPLMN derivation when the USIM is changed and EPSLOCI is not stored in the USIM, according to some example embodiments. In this case, the USIM is changed and the EPSLOCI is not stored in the USIM. Here, the EPSLOCI stored in the flash memory of the UE will be invalidated. All the values stored in the UE correspond to the previously used USIM so when the USIM is changes, the stored values are incorrect. According to FIG. 2, at operation 201, an RPLMN is derived from location information such as TAI, RAI and LAI. The LAI and RAI information are read from the new USIM. The TAI and evolved packet system (EPS) Update status are invalidated from the flash memory. Preferred lists are read from the USIM and unwanted AccTechs are removed based on the current operating mode. Here, the preferred lists comprise the PLMN and the AccTech, the combination of which is stored in SIM card. The preferred lists are configured by the service provider and stored in the SIM card. The preferred list can be changed only by the service provider. According to some example embodiment, the stored AccTech for a PLMN in the preferred list can also comprise of AccTech which is not supported by the UE currently. e.g. Preferred list can comprise of AccTechs LTE/UMTS/GSM but UE could be operating in GSM only mode. In this case, LTE and UMTS AccTechs are unwanted and ignored. At operation 202, a search is performed for an RPLMN (which is a derived RPLMN) in preferred lists stored in the SIM (also referred to as SIM preferred lists). According to some example embodiments, the SIM preferred lists include a home public land mobile network (HPLMN) selector with access technology, a user controlled PLMN selector with access technology, and an operator controlled PLMN selector with access technology. After the search, at operation 203, it is determined whether an RPLMN is found in the preferred lists. If an RPLMN is found in any of the preferred lists, then at operation 204, all preferred AccTechs are stored as RPLMN AccTechs. Here, the preferred AccTechs refer to RATs supported by an RPLMN found in the preferred list. If an RPLMN is not found in any of the preferred lists, then at operation 205, all AccTechs supported by the operating mode are stored as RPLMN AccTechs. According to some example embodiments, remaining supported AccTech may be added to the stored AccTech based on the validity of location update status information. Here, the remaining supported AccTech refers to AccTech that are not present in the SIM preferred list but from previous registration information of EPSLOCI/PSLOCI/LOCI, UE determines that registration which is possible. For example, the AccTech present in SIM preferred list can be: UMTS/GSM only but if EPS LOCI is valid, LTE AccTech is also added to the stored RPLMN AccTech based on the information that LTE registration was successful previously. At operation 206, a RAT is selected using the derived RPLMN AccTechs. According to some example embodiments, the stored AccTech (Access Technology) is a list of supported RATs. The AccTech (Access Technology) is also referred to as RAT (Radio Access Technology) and are usually used interchangeably. According to some example embodiments, the RAT is selected according to operations discussed in association with FIG. 4 below.

Figure 3:
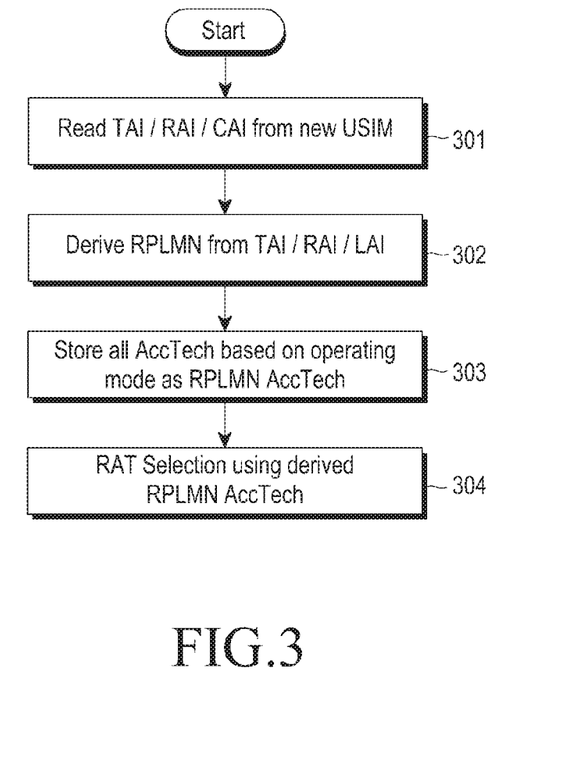
FIG. 3 is a schematic flow diagram illustrating RPLMN derivation when the USIM is changed and EPSLOCI is present in the USIM, according to some example embodiments.

FIG. 3 is a schematic flow diagram illustrating RPLMN derivation when the USIM is changed and EPSLOCI is stored in the USIM, according to some example embodiments. In this case, the USIM is changed and the EPSLOCI is stored in the USIM. The EPSLOCI stored in the flash memory will be invalidated. According to FIG. 3, at operation 301, the EPSLOCI, PSLOCI and LOCI will be read from the new USIM. TAI, RAI and LAI information is validated from corresponding update statuses to derive the RPLMN. At operation 302, an RPLMN is derived from location information such as TAI, RAI and LAI. According to some example embodiments, the RPLMN is derived using a last registered RAT stored in the flash memory along with domain information when public land mobile networks (PLMNs) derived from the EPSLOCI and LOCI are different and not equivalent to each other. On deriving the RPLMN, at operation 303, all AccTechs based on the operating mode are stored as RPLMN AccTechs. Here, all supported AccTechs are added as RPLMN AccTechs irrespective of the last registered RAT as the UE has previous registration information stored either in the SIM or in non-volatile memory. At operation 304, a RAT is selected using the derived RPLMN AccTechs. According to some example embodiments, the RAT is selected according to operations discussed in association with FIG. 4 below.

Figure 4:
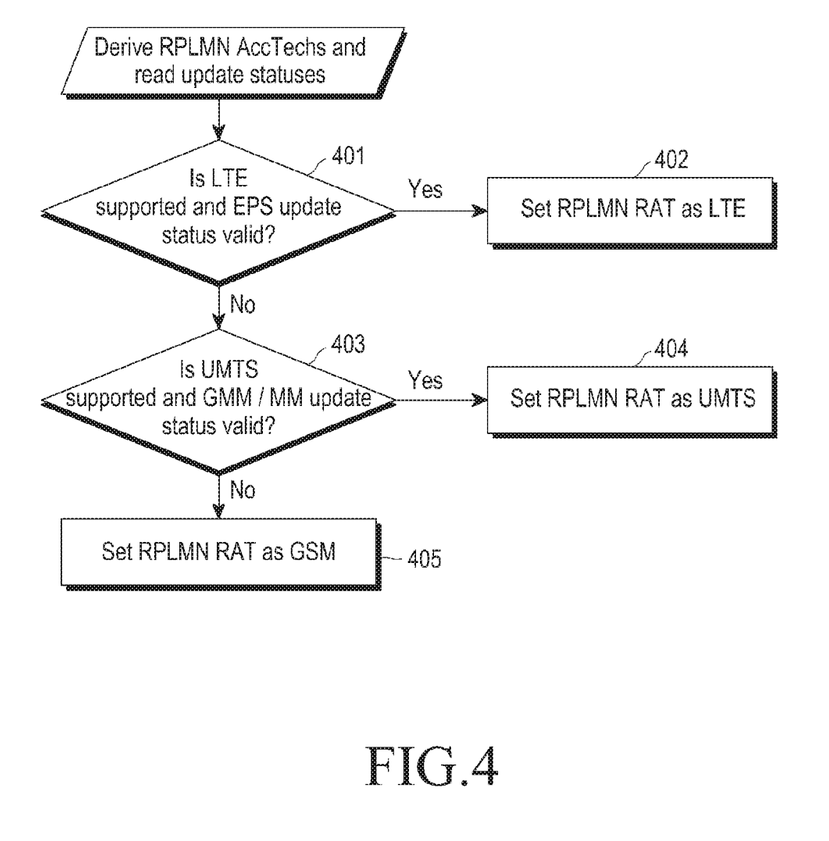
FIG. 4 is a schematic flow diagram illustrating RPLMN RAT selection, according to some example embodiments.

FIG. 4 is a schematic flow diagram illustrating RPLMN RAT selection, according to some example embodiments. According to some example embodiments, an RPLMN RAT is selected based on derived RPLMN AccTechs and EPSUpdateStatus/LocUpdateStatus/RauUpdateStatus read from the SIM. An RPLMN RAT is selected in order of LTE>Universal Mobile Telecommunication Service (UMTS)>Global System for Mobile communication (GSM). In case where the procedure in FIG. 4 cannot determine the RPLMN RAT, a default rule is used where a RAT is selected based on only the operating mode and in order of LTE>UMTS>GSM. According to FIG. 4, at operation 401, check for validity of an EPS update status and support for a long-term evolution (LTE) network. At operation 402, select an RPLMN RAT mode as LTE when the EPS update status is valid and long-term evolution (LTE) is supported. At operation 403, check for validity of a General Packet Radio Service (GPRS) Mobility Management (GMM)/Mobility Management (MM) update status and support for universal mobile telecommunications system (UMTS) when the EPS update status is not valid or the long-term evolution (LTE) is not supported. At operation 404, the RPLMN RAT mode is selected as UMTS when the GMM/MM update status is valid and the universal mobile telecommunications system (UMTS) is supported. At operation 405, the RPLMN RAT mode is selected as global system for mobile communication (GSM) when the GMM/MM update status is not valid and the universal mobile telecommunications system (UMTS) is not supported.

Further, when a rejection is received for a stored frequency scan for an RPLMN, immediately an RPLMN will be searched for on the next highest priority RAT. Accordingly, the speed by which camping begins on next highest priority RAT if registration fails on highest priority RAT is increased.

According to some example embodiments, a wireless communication device may be configured to perform the operations of the UE described above in connection with FIGS. 1-4. The UE may include at least one processor, a SIM, a USIM, a memory, and a transceiver. The SIM, USIM, memory and the transceiver may be communicably coupled to the at least one processor. The wireless communication device may communicate with one or more networks using the transceiver. The memory may be a non-volatile memory such as flash memory. According to some example embodiments, the wireless communication device may be a smartphone, a mobile phone, a navigation device, a personal computer, a laptop computer, a digital broadcasting terminal, a personal digital assistant, a portable multimedia player, a tablet, a game console, a wearable device, an augmented reality and/or virtual reality device, and Internet of things device, etc.

Figure 5:
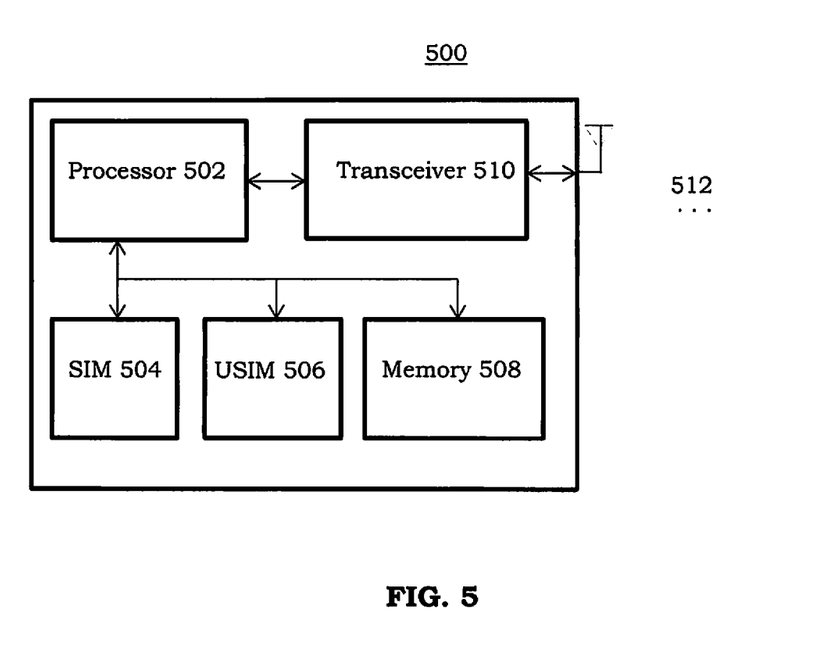
FIG. 5 is a block diagram of a wireless communication device, according to some example embodiments.

FIG. 5 is a block diagram of a wireless communication device, according to some example embodiments. Referring to FIG. 5, a wireless communication device 500 may be configured to perform the operations of the UE described above in connection with FIGS. 1-4. The wireless communication device 500 may include at least one processor 502, a SIM 504, a USIM 506, a memory 508, and a transceiver 510. The SIM 504, USIM 506, memory 508 and the transceiver 510 may be communicably coupled to the at least one processor 502. The wireless communication device 500 may communicate with one or more networks 512 using the transceiver 510.

According to some example embodiments, operations described herein as being performed in FIGS. 1-4 may be performed by the at least one processor executing program code that includes instructions corresponding to the operations. The instructions may be stored in the memory of the wireless communication device. The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multi-processor, an application-specific integrated circuit (ASIC), and a field programmable gate array (FPGA). The memory may be a random access memory (RAM), flash memory, read only memory (ROM), erasable programmable ROM (EPROM), electrically erasable programmable ROM (EEPROM), registers, hard disk, removable disk, compact disc ROM (CD-ROM) or any other type of storage medium known in the art.

In the preceding detailed description of some example embodiments, reference is made to the accompanying drawings that form a part hereof, and in which are shown by way of illustration some example embodiments which may be practiced. These example embodiments are described in sufficient detail to enable those skilled in the art to practice the example embodiments, and it is to be understood that other example embodiments may be utilized and that changes may be made without departing from the scope of the example embodiments. The following detailed description is, therefore, not to be taken in a limiting sense, and the scope of the example embodiments is defined only by the appended claims.

What is claimed is:

1. A method performed by a wireless communication device for selecting a radio access technology (RAT) mode, the method comprising:
   determining location information of the wireless communication device;
   identifying a public land mobile network (PLMN) based on the location information;
   obtaining a subscriber identity module (SIM) preferred list from a SIM based on a current operating mode;
   when the identified PLMN is present in the obtained SIM preferred list, identifying one or more first access technology (AccTech) recorded in the SIM preferred list corresponding to the identified PLMN;
   when the identified PLMN is absent in the SIM preferred list, identifying one or more second AccTech supported by the current operating mode; and
   determining the RAT mode based on the one or more first AccTech or the one or more second AccTech.

2. The method as claimed in claim 1, wherein the location information includes tracking area identity (TAI) information, routing area identification (RAI) information and location area identity (LAI) information which are extracted from evolved packet system location information (EPSLOCI), packet system location information (PSLOCI) and location information (LOCI), respectively.

3. The method as claimed in claim 1, wherein the determining the location information includes one of:
   reading EPSLOCI either from a SIM or a flash memory when a User Services Identity Module (USIM) is not changed; or
   reading the EPSLOCI from a new USIM and invalidating the EPSLOCI from the flash memory when the USIM is changed.

4. The method as claimed in claim 1, wherein the determining the location information includes reading PSLOCI or LOCI from a Subscriber Identity Module (SIM).

5. The method as claimed in claim 1, further comprising;
   adding at least one remaining supported AccTech to the stored RPLMN AccTech based on whether location update status information is valid.

6. The method as claimed in claim 1, wherein the SIM preferred list comprises a home public land mobile network (HPLMN) selector with access technology, a user controlled PLMN selector with access technology, and an operator controlled PLMN selector with access technology.

7. The method as claimed in claim 1, wherein the deriving derives the RPLMN using a last registered RAT and domain information when the validating is unsuccessful.

8. The method as claimed in claim 1, wherein the selecting the RAT mode comprises:
   checking whether an EPS update status is valid and long-term evolution (LTE) is supported;
   selecting the RAT mode as LTE when the EPS update status is valid and long-term evolution (LTE) is supported;
   checking whether a GMM/MM update status is valid and universal mobile telecommunications system (UMTS) is supported when the EPS update status is not valid or long-term evolution (LTE) is not supported;
   selecting the RAT mode as UMTS when the GMM/MM update status is valid and universal mobile telecommunications system (UMTS) is supported; and
   selecting the RAT mode as global system for mobile communication (GSM) when the GMM/MM update status is not valid and universal mobile telecommunications system (UMTS) is not supported.

9. The method as claimed in claim 5, wherein the selecting the RAT mode is based on the current operating mode and in a priority order from highest to lowest of (i) LTE, (ii) UMTS and (iii) GSM.

10. The method as claimed in claim 8 further comprising:
    searching for an RPLMN using stored frequencies on a next highest priority RAT if the wireless communication device receives a rejection or if registration fails on a highest priority RAT.

11. A wireless communication device for selecting a radio access technology (RAT) mode, the wireless communication device comprising:
    a memory; and
    at least one processor configured to
       determine location information of the wireless communication device,
       identify a public land mobile network (PLMN) based on the location information,
       obtain a subscriber identity module (SIM) preferred list from a SIM based on a current operating mode,
       when the identified PLMN is present in the obtained SIM preferred list, identifying one or more first access technology (AccTech) recorded in the SIM preferred list corresponding to the identified PLMN,
       when the identified PLMN is absent in the SIM preferred list, identifying one or more second AccTech supported by the current operating mode, and
       determining the RAT mode based on the one or more first AccTech or the one or more second AccTech.

12. The wireless communication device as claimed in claim 11, wherein the location information includes tracking area identity (TAI) information, routing area identification (RAI) information and location area identity (LAI) information which are extracted from evolved packet system location information (EPSLOCI), packet system location information (PSLOCI) and location information (LOCI), respectively.

13. The wireless communication device as claimed in claim 11, wherein the at least one processor is configured to:
    read EPSLOCI either from a SIM or a flash memory when a User Services Identity Module (USIM) is not changed; and
    read the EPSLOCI from a new USIM and invalidate the EPSLOCI from the flash memory when the USIM is changed.

14. The wireless communication device as claimed in claim 11, wherein the at least one processor is configured to read PSLOCI or LOCI from a Subscriber Identity Module (SIM).

15. The wireless communication device as claimed in claim 11, wherein the at least one processor is further configured to add at least one remaining supported AccTech to the stored RPLMN AccTech based on whether location update status information is valid.

16. The wireless communication device as claimed in claim 11, wherein the SIM preferred list comprises a home public land mobile network (HPLMN) selector with access technology, a user controlled PLMN selector with access technology, and an operator controlled PLMN selector with access technology.

17. The wireless communication device as claimed in claim 11, wherein the at least one processor is further configured to derive the RPLMN using a last registered RAT and domain information when the validation is unsuccessful.

18. The wireless communication device as claimed in claim 11, wherein the at least one processor is configured to:
   check whether an EPS update status is valid and long-term evolution (LTE) is supported;
   select the RAT mode as LTE when the EPS update status is valid and long-term evolution (LTE) is supported;
   check whether a GMM/MM update status is valid and universal mobile telecommunications system (UMTS) is supported when the EPS update status is not valid or long-term evolution (LTE) is not supported;
   select the RAT mode as UMTS when the GMM/MM update status is valid and universal mobile telecommunications system (UMTS) is supported; and
   select the RAT mode as global system for mobile communication (GSM) when the GMM/MM update status is not valid and universal mobile telecommunications system (UMTS) is not supported.

\* \* \* \* \*